United States Patent [19]
Milawski et al.

[11] Patent Number: 6,108,961
[45] Date of Patent: Aug. 29, 2000

[54] TWISTED, SPINNING FISHING LURE AND COUNTERWEIGHT

[76] Inventors: Scott J. Milawski, 2912 N. Noble Ave., Golden Valley, Minn. 55422; Frederick Wylie Hauck, 8525 33$^{rd}$ Ave. North, Crystal, Minn. 55427

[21] Appl. No.: 09/163,730

[22] Filed: Sep. 30, 1998

Related U.S. Application Data

[60] Provisional application No. 60/085,285, May 13, 1998.

[51] Int. Cl.$^7$ ............................ A01K 85/00; A01K 85/12
[52] U.S. Cl. ...................... 43/42.19; 43/42.11; 43/42.13; 43/42.16; 43/42.2
[58] Field of Search ................. 43/42.11, 42.13, 43/42.14, 42.16, 42.17, 42.18, 42.19, 42.2

[56] References Cited

U.S. PATENT DOCUMENTS

| | | |
|---|---|---|
| D. 62,163 | 4/1923 | Bourgon . |
| D. 218,966 | 10/1970 | Weimer ..................................... D22/7 |
| 295,350 | 3/1884 | Chapman . |
| D. 335,518 | 5/1993 | Greve ..................................... D22/129 |
| 1,002,785 | 9/1911 | Telford . |
| 1,140,279 | 5/1915 | Myers ..................................... 43/42.16 |
| 1,989,850 | 2/1935 | Dorsey ............................................ 43/4 |
| 1,993,868 | 3/1935 | Thornberg ..................................... 43/47 |
| 2,493,431 | 1/1950 | Wold ..................................... 43/42.19 |
| 2,497,807 | 2/1950 | Wold ..................................... 43/42.2 |
| 2,598,965 | 6/1952 | Bain ..................................... 43/42.2 |
| 2,665,516 | 1/1954 | Race ..................................... 43/42.51 |
| 2,778,144 | 1/1957 | Jones ..................................... 43/42.11 |
| 2,835,999 | 5/1958 | Gillian ..................................... 43/42.2 |
| 4,174,584 | 11/1979 | Howard ..................................... 43/42.5 |
| 4,201,008 | 5/1980 | Sparkman ..................................... 43/43.13 |
| 4,257,183 | 3/1981 | Arms ..................................... 43/42.19 |
| 4,501,087 | 2/1985 | Blomquist ..................................... 43/42.06 |
| 4,637,158 | 1/1987 | Reid ..................................... 43/42.19 |
| 4,796,379 | 1/1989 | Rabideau ..................................... 43/42.48 |
| 4,858,367 | 8/1989 | Rabideau ..................................... 43/42.25 |
| 4,891,901 | 1/1990 | Baker, Jr. ..................................... 43/42.11 |
| 5,031,350 | 7/1991 | Rabideau ..................................... 43/43.4 |
| 5,245,781 | 9/1993 | Helmuth ..................................... 43/42.2 |
| 5,263,277 | 11/1993 | Kelly ..................................... 43/43.13 |
| 5,303,497 | 4/1994 | Rabideau ..................................... 43/42.21 |
| 5,381,621 | 1/1995 | Fuller ..................................... 43/42.13 |
| 5,394,636 | 3/1995 | Rabideau ..................................... 43/42.13 |
| 5,461,819 | 10/1995 | Shindledecker ..................................... 43/42.13 |
| 5,491,926 | 2/1996 | Mostovsky ..................................... 43/42.19 |

*Primary Examiner*—Kurt Rowan
*Attorney, Agent, or Firm*—Crompton, Seager & Tufte, LLC

[57] ABSTRACT

A fishing lure including a proximal end, a distal end, a counterbalance arm, and a rotatable helical body element having a lumen therethrough and a wire extending through the lumen. In one lure the wire includes a proximal portion having a eyelet for attaching to a fishing line and a counterbalance arm extending distally from the eyelet. One lure also includes bearings to reduce rotational forces from being transmitted from the rotatable helical body element to the wire extending through the body lumen. Any rotation forces transmitted to the wire are at least partially opposed by the counterbalance arm. The counterbalance arm in one lure is formed of wire and has lead weights disposed over the wire. Gravity acts on the weighted counterbalance arm to oppose rotation upward and thereby opposes rotation of the wire, eyelet, and attached fishing line.

18 Claims, 3 Drawing Sheets

TWISTED, SPINNING FISHING LURE AND COUNTERWEIGHT

CROSS REFERENCE TO RELATED APPLICATIONS

This application claims the benefit of U.S. Provisional Patent Application Ser. No. 60/085,285, filed May 13, 1998, and entitled "TWISTED, SPINNING FISHING LURE WITH COUNTER WEIGHT".

FIELD OF THE INVENTION

The present invention relates to fishing lures and, in particular, to fishing lures which eliminate the twist in fishing line caused by the rotation of the lure.

BACKGROUND OF THE INVENTION

Success in fishing is highly dependent upon the equipment and tackle an angler uses. Thus, innovations in equipment and tackle remain constant in order to shift the success in fishing in favor of the angler. Innovations in tackle, however, especially capture the attention of anglers. A lure that accurately simulates the appearance and actions of fish bait are virtually guaranteed success. One type of lure intended to simulate the appearance and actions of a fish is the spinning lure.

The problems associated with spinning lures originate from the rotation of the lure. When a spinning lure is rotated through water, the action of rotation is not confined to the lure alone. This action is also transposed onto the fishing line. This transportation phenomenon is called line twist. Line twist plagues anglers because of the potentially damaging effects that result to the angler's equipment. In particular, spinning reels which hold the line, and the line itself, are common casualties of line twist. The amount of twist introduced into the line generally increases with each cast of a spinning lure. As the twisted line is repeatedly rewound onto the spinning reel by repeated casts of the spinning lure, the twisted line will eventually unravel from the reel rendering the reel temporarily inoperable. To correct this problem, the unraveled and twisted line is typically cut from the spool and discarded.

Numerous prior art devices have tried to resolve the problem of line twist. In U.S. Pat. No. 5,263,277, Kelly discloses a lure that is designed specifically to remove the twist that pre-exists in the fishing line. In this design, fins are attached to the lure to impart a controlled spin in the opposite direction as the line twist. The lure is additionally designed to catch fish. Thus, with every cast of the lure, the angler is able to remove the line twist and fish at the same time. This design, however, makes determining the precise amount of correction needed difficult. Conceivably, one excess cast of the lure would result in an over-correction, once again causing line twist.

Most prior art devices, however, are designed to resist the twisting of the line as the result of the motion or movements of the lure through the water. In U.S. Pat. No. 5,245,781, Helmuth discloses a lure having a helical shaped spinner body mounted on a wire lanyard. The helical spinner body is disposed on the lanyard through openings within the helical spinner body. Helmuth teaches that because the helical spinner body is not directly attached to the lanyard, the rotation of the lure through the water will not be transposed to the fishing line. This design, however, does not take into consideration fluid dynamics and friction. If the spinning lure is retrieved at a reasonable speed, the rotational friction exerted upon the lanyard will be enormous. As a result, the lanyard will indeed rotate causing line twist.

Another device disclosed in U.S. Pat. No. 4,501,087 to Blomquist positions an additional element onto the lure specifically designed to prevent line twist. Blomquist discloses a lure having a swivel element which when acted upon by water, resists rotation. The impedance of the lure's rotation subsequently prevents twisting in the fishing line. The dilemma associated with fluid dynamics and friction apply to this design as well.

SUMMARY OF THE INVENTION

The present invention comprises a spinning lure that eliminates line twisting in light of the problems associated with fluid dynamics and friction. The present invention also provides a fishing lure that attracts fish to strike. One lure according to the present invention includes a rotatable helical body element which propagates optical and hydrodynamic effects through the water.

The present invention avoids the disadvantages of the prior art devices by applying a counter-balance arm. As the lure is drawn through the water, the helical segment of the lure is allowed to freely rotate around a shaft. However, as frictional forces increase between the spinning helical segment and shaft, the counter-balance arm prohibits the rotation of the shaft. Thus, the fishing line will not twist.

By insuring that line twist will not occur, alternate design configurations were developed to enhance the presentation of the lure itself. The present invention utilizes the counter-balance arm in spinning lure designs that contain more than one helical body segment, spoons, dressing material, and with other performance enhancing additions.

DETAILED DESCRIPTION OF THE DRAWINGS

Figure 1:
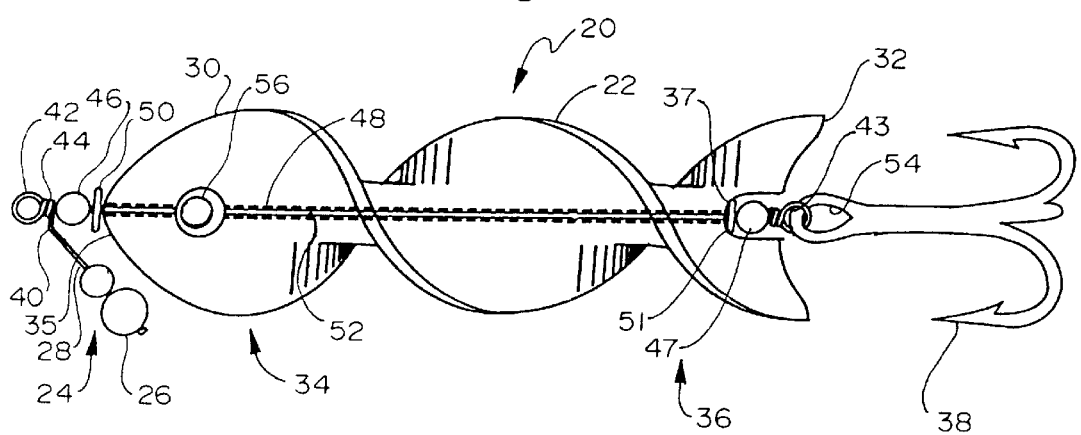
FIG. 1 is a perspective view of a fishing lure including a counterbalance arm and a helical body element having a tapered head and a fluked tail.

FIG. 1 is a fishing lure 20 including a helical body 22 and a counterbalance 24. Lure 20 includes a proximal region 34, a proximal end surface 35, a distal region 36, and a distal end surface 37. Counterbalance 24 includes a weight 26 disposed about a counterbalance arm 28. Counterbalance arm 28 is preferably formed of a wire 40, which continues to form an eyelet 42, which is created by a wire twist 44. Weight 26 can include multiple weight elements, preferably formed of lead and having a lumen therethrough for stringing over wire 40. Wire 40 can continue distally from eyelet 42 through a proximal bead or weight 46 and further through a proximal bearing or washer element 50. Bead 46 and washer 50 form a bearing to reduce rotational forces brought to bear on wire 40 including eyelet 42. Wire 40 can continue distally through a lumen 48 in helical body 22, forming a lanyard portion 52 of wire 40. Wire 40 can continue distally through a distal bearing or washer 51 and through a lumen in a distal bead or weight 47, terminating in a distal eyelet 43. Eyelet 43 is secured to an eyelet 54 in treble hook 38. In a preferred embodiment, a lure eye 56 is disposed on at least one side of helical body proximal region 34.

In use, fishing lure 20 can be attached to a fishing line through proximal eyelet 42. As lure 20 is pulled through the water, helical member 22 rotates about the longitudinal axis and lumen 48. This rotation propagates optical indications of movement to gamefish. As helical body 22 rotates, hydrodynamic waves are created by this rotation and these waves are sensed by game fish, adding to effectiveness of the lure. As helical body 20 rotates about the longitudinal axis, proximal end surface 35 rotates against the bearing 50. To the extent any rotation is imparted to bearing 50, bearing 50 rotates against the proximal bead 46. In this way, very little, if any, rotation is imparted to wire twist 44 and eyelet 42. Any rotation imparted to eyelet 42 is counteracted by counterbalance 24. Counterbalance 24, by operation of gravity acting on the arm, provides a downward stabilizing force acting to prevent weight 26 from rotating upward in either direction. Counterbalance 24 also guides weeds past hook 38 without snagging. As helical body 22 rotates about lumen 48, some frictional rotational force is imparted to lanyard wire portion 52 extending through the lumen. This rotational friction force is also substantially, if not totally, counteracted by counterbalance 24. At distal end 37, distal bearing 51 and distal bead 47 also act to reduce any rotational force applied to distal eyelet 43 by distal surface 37.

Figure 2:
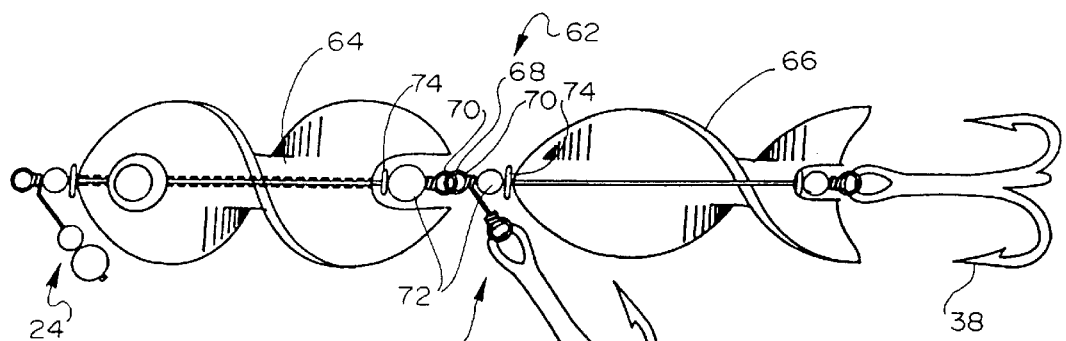
FIG. 2 is a perspective view of a tapered midsection fishing lure including a counterbalance arm, a proximal helical segment having a tapered distal end, an intermediate treble hook, and a distal helical segment having a fluked tail.
Figure 3:
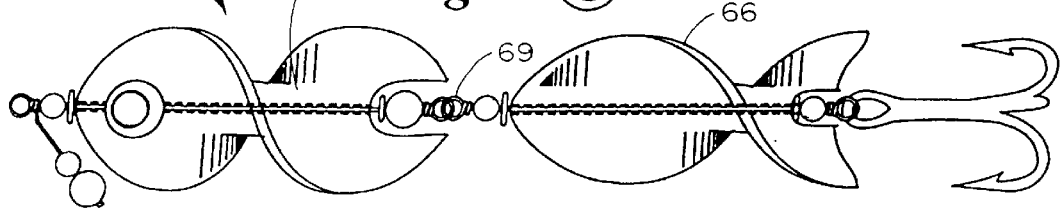
FIG. 3 is a perspective view of a tapered midsection fishing lure similar to the lure of FIG. 2, but not having an intermediate treble hook.

Referring now to FIG. 2, a dual segment lure 62 is illustrated, having a proximal tapered helical segment 64 and a distal, fluked tail, helical segment 66, joined by a midsection 68 through a union 69. Union 69 includes a pair of eyelets 70, beads 72, and washers 74. A second treble hook 39 is secured to union 69 as well. Lure 62 provides a second hook and therefore a second location for a game fish to strike. Referring now to FIG. 3, another two-segment lure 76 is illustrated. Lure 76 includes proximal, tapered helical segment 64 and distal, fluked tail, helical segment 66, joined by union 69. Lure 76 is similar to lure 62 of FIG. 2, but not having second treble hook 39.

Figure 4:
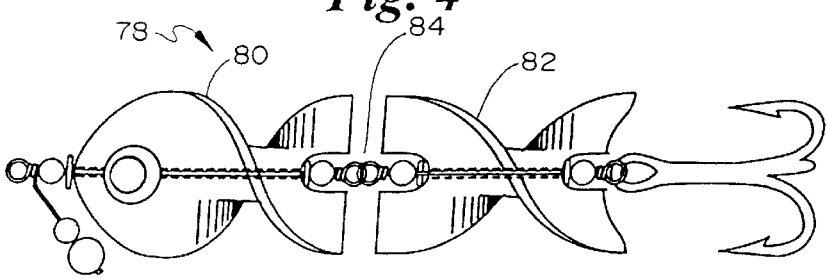
FIG. 4 is a non-tapered midsection fishing lure including a counterbalance arm, a proximal helical segment having a non-tapered distal end, and a distal helical segment having a non-tapered proximal end and a distal fluked tail.

Referring now to FIG. 4, another two-segment lure 78 is illustrated, having a non-tapered midsection 84. This may be contrasted with tapered midsection 77 of lure 76 in FIG. 3. Lure 78 includes a proximal, helical section 80 having a flat edge, non-tapered distal end and a distal, helical segment 82 having a flat edge, non-tapered proximal end.

Figure 5:
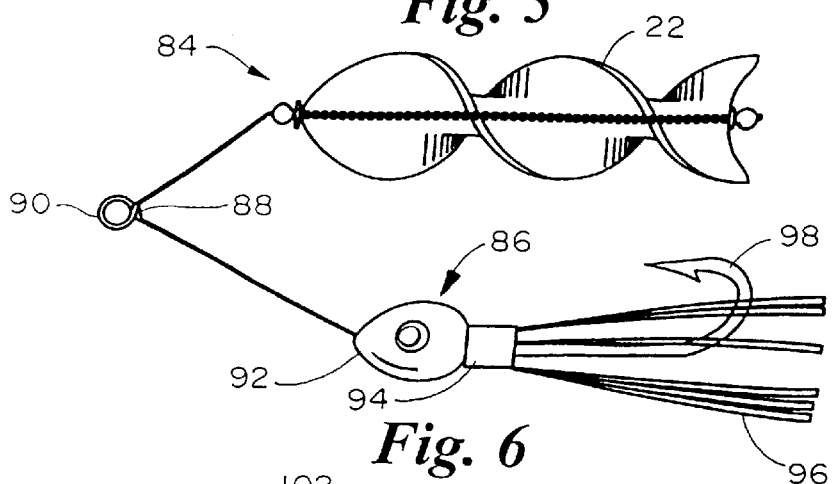
FIG. 5 is a perspective view of a fishing lure including a counterbalance arm and a helical body element, where the counterbalance includes a weighted artificial fly.

Referring now to FIG. 5, a lure 84 is illustrated having a lure or fly 86. Lure 84 includes an arm 88 having two segments joined by an eyelet 90. Fly 86 thus functions as a weight at the end of the counter balance arm. Arm 88 is attached to both fly 86 and helical body element 22. Fly 86 includes a head 92, a collar 94, dressing material 96, and a hook 98. Head 92 is preferably weighted, most preferably formed of a metal. Dressing material 96 can be selected from materials well known to those skilled in the art, such as buck tail, feather, and plastic. Lure 84 can resemble a fish and a minnow swimming in tandem. To a game fish, it may appear that helical segment 22 is a fish chasing fly or minnow 86.

Figure 6:
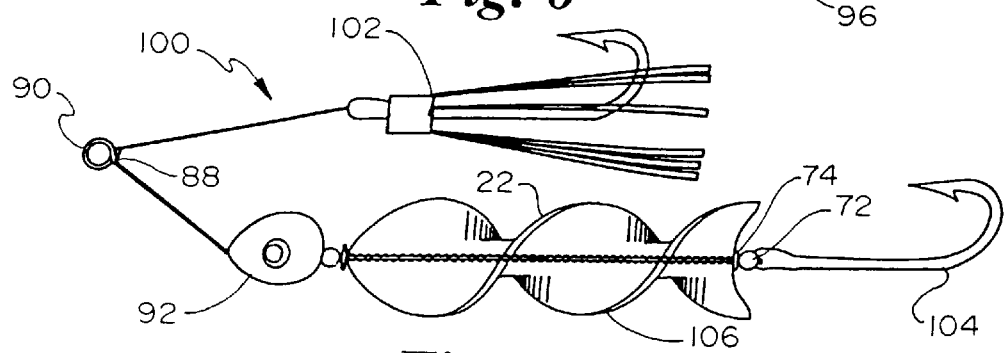
FIG. 6 is a fishing lure including a counterbalance arm and a helical body element, the helical body element including a hook and a head.

Referring now to FIG. 6, a lure 100 is illustrated having a fly 102 attached to one part of arm 88 and a helical lure 106 attached to the other part of arm 88. Helical lure 106 includes head 92, helical member 22, and distal hook 104. In a preferred embodiment, distal hook 104 is secured to helical lure 106 through washer 74 and bead 72, as discussed previously.

Figure 7:
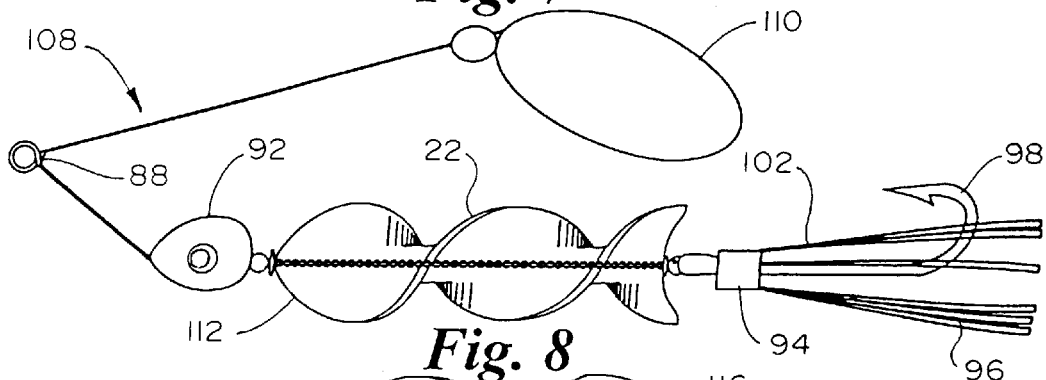
FIG. 7 is a fishing lure including a counterbalance arm and a helical body element having a hook and dressing material disposed at the distal end, where the counterbalance includes a spoon.

Referring now to FIG. 7, another lure 108 is illustrated having a spoon 110 secured to one part of arm 88 and a helical lure 112 secured to the other part of arm 88. Helical lure 112 includes head 92, helical member 22, and fly 102, including collar 94, dressing 96, and hook 98.

Figure 8:
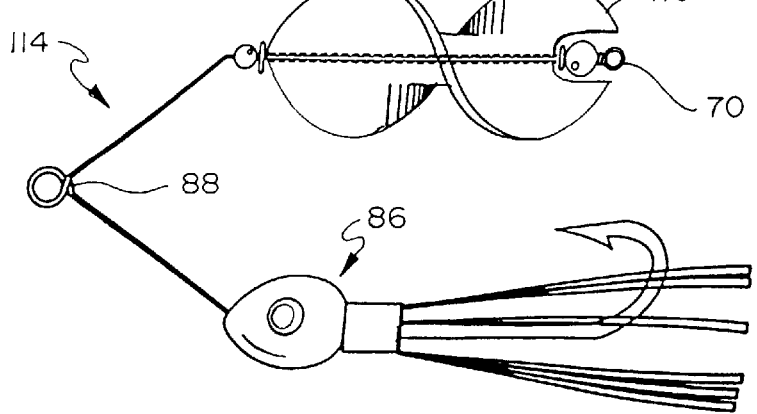
FIG. 8 is a fishing lure including a counterbalance arm and a helical body element having a distal eyelet, where the counterbalance includes a weighted artificial fly.

Referring now to FIG. 8, yet another embodiment of the invention is illustrated in lure 114. Lure 114 includes a non-tapered helical lure 116, including distal eyelet 70 for attaching other devices. Non-tapered helical lure 116 is secured to one part of arm 88, and fly 86, discussed with respect to FIG. 5, is attached to the other part of arm 88.

The present invention provides a lure attractive to many game fish through the spinning action of the various helical segments. The spinning helical segments provide an optical attraction for game fish through the reflection of light off the helical members. The reflected light from the rotating helical members provides movement and/or the illusion of movement in a direction other than the direction of the lure being pulled. The rotation also generates hydrodynamic waves as discussed previously. The counterbalance arm provides a counteracting force to prevent the proximal eyelet attached to the fishing line from rotating. Inhibiting this rotation greatly resists the tendency to rotate the fishing line as discussed previously which can act to interfere with use of fishing gear. The present invention is suitable for use with spinner bait, buzz bait, and crank bait.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A fishing lure for catching fish in water, comprising:
a generally helical body segment having a proximal end, a distal end, and a lumen running therethrough;
the helical body segment further including a generally fluke shaped tail portion generally symmetrically disposed about the lumen of the helical body proximate the proximal end thereof;
the helical body segment further including a tapered head portion generally symmetrically disposed about the lumen of the helical body segment proximate the distal end thereof;
a strand, the strand traversing through the lumen of the helical body segment, such that the helical body rotates about the strand through the lumen when the lure is pulled through the water;
a line attachment eyelet disposed at the proximal end of the strand;

first means for hooking the fish operably coupled to the strand;

a counter-balance arm attached to the strand proximate the eyelet the counter-balance arm extending generally downwardly and rearwardly from the eyelet; and a counter-balance weight disposed about the counter-balance arm, such that any rotational forces imparted by the rotation to the strand is at least partially counteracted by a gravitational force acting to prevent rotational movement of the counterbalance arm.

2. The fishing lure of claim 1, wherein the material for the helical body segment is selected from the group consisting of plastic, wood, aluminum, stainless steel, lead, and combinations thereof.

3. The artificial fishing lure of claim 1, wherein at least one bearing element selected from the group consisting of a bead, a washer and a weight is positioned on at least one end of the helical body segment via the strand.

4. The artificial fishing lure of claim 1, wherein the first means for hooking is positioned at the distal end of the helical body segment via the strand.

5. The artificial fishing lure of claim 1, wherein the first hooking means includes a treble hook.

6. The artificial fishing lure of claim 1, wherein a dressing material is attached to the distal end of the helical body segment.

7. The artificial fishing lure of claim 1, wherein a dressing material is attached to the counter-balance arm.

8. The artificial fishing lure of claim 1, wherein a dressing material is attached to the first hooking means.

9. The artificial fishing lure of claim 1, wherein at least one bearing element is attached to the counter-balance arm.

10. A fishing lure for catching fish in water, comprising:

a generally helical body segment having a proximal end, a distal end, and a lumen running therethrough;

wherein the lumen of the body segment is in coaxial alignment with a central axis of the helical body;

the helical body segment further including a generally fluke shaped tail portion generally symmetrically disposed about the lumen of the helical body proximate the proximal end thereof;

wherein the profile of the tail portion simulates the profile of a fish tail;

the helical body segment further including a tapered head portion generally symmetrically disposed about the lumen of the helical body segment proximate the distal end thereof;

wherein the tapered head portion simulates the profile of a fish head;

at least one facial indicia including at least one eye applied to a surface of the helical body proximate the tapered head portion thereof;

a strand, the strand traversing through the lumen of the helical body segment, such that the helical body rotates about the strand through the lumen when the lure is pulled through the water;

a line attachment eyelet disposed at the proximal end of the strand;

first means for hooking the fish operably coupled to the strand;

a counter-balance arm attached to the strand, proximate the eyelet, the counter-balance arm extending generally downwardly and rearwardly from the eyelet; and a counter-balance weight disposed about the counter-balance arm, such that any rotational forces imparted by the rotation to the strand is at least partially counteracted by a gravitational force acting to prevent rotational movement of the counterbalance arm.

11. The fishing lure of claim 10, wherein the material for the helical body segment is selected from the group consisting of plastic, wood, aluminum, stainless steel, lead, and combinations thereof.

12. The artificial fishing lure of claim 10, wherein at least one bearing element selected from the group consisting of a bead, a washer and a weight is positioned on at least one end of the helical body segment via the strand.

13. The artificial fishing lure of claim 10, wherein the first means for hooking is positioned at the distal end of the helical body segment via the strand.

14. The artificial fishing lure of claim 10, wherein the first hooking means includes a treble hook.

15. The artificial fishing lure of claim 10, wherein a dressing material is attached to the distal end of the helical body segment.

16. The artificial fishing lure of claim 10, wherein a dressing material is attached to the counter-balance arm.

17. The artificial fishing lure of claim 10, wherein a dressing material is attached to the first hooking means.

18. The artificial fishing lure of claim 10, wherein at least one bearing element is attached to the counter-balance arm.

* * * * *